US012483153B2

(12) United States Patent
Huang et al.

(10) Patent No.: US 12,483,153 B2
(45) Date of Patent: Nov. 25, 2025

(54) LOSSLESS SYNCHRONOUS RECTIFICATION POWER SUPPLY CIRCUIT AND DESIGN METHOD

(71) Applicant: Navitas Semiconductor Limited, Dublin (IE)

(72) Inventors: Xiucheng Huang, Torrance, CA (US); Yingchuan Lei, Shanghai (CN); Yun Zhou, Shenzhen (CN); Weijing Du, Torrance, CA (US)

(73) Assignee: Navitas Semiconductor Limited, Dublin (IE)

( * ) Notice: Subject to any disclaimer, the term of this patent is extended or adjusted under 35 U.S.C. 154(b) by 199 days.

(21) Appl. No.: 18/357,051

(22) Filed: Jul. 21, 2023

(65) Prior Publication Data

US 2024/0048062 A1 Feb. 8, 2024

Related U.S. Application Data

(60) Provisional application No. 63/383,460, filed on Nov. 11, 2022.

(51) Int. Cl.
*H02M 3/335* (2006.01)
*H02M 1/00* (2006.01)

(52) U.S. Cl.
CPC ..... *H02M 3/33592* (2013.01); *H02M 1/0006* (2021.05); *H02M 1/0051* (2021.05)

(58) Field of Classification Search
CPC ... H02M 3/33592; H02M 1/0006; H02M 1/34
See application file for complete search history.

(56) References Cited

U.S. PATENT DOCUMENTS

| 9,979,309 B1* | 5/2018 | Green | H02M 1/08 |
| 10,340,802 B1* | 7/2019 | Ke | H02M 1/34 |
| 2016/0373010 A1* | 12/2016 | Yoshinaga | H02M 3/33592 |

\* cited by examiner

*Primary Examiner* — Alex Torres-Rivera
(74) *Attorney, Agent, or Firm* — FisherBroyles, LLP

(57) ABSTRACT

A low power-loss supply circuit minimizes the losses in a synchronous rectifier power conversion circuit by regulating the voltage supply (Vcc) of a synchronous rectifier controller. The low power-loss supply circuit uses two regulating capacitors to regulate the value of the voltage supplied to the controller. A first regulating capacitor supplies the input voltage which powers the synchronous rectifier controller. A second regulating capacitor is used to cyclically charge the first regulating capacitor.

20 Claims, 15 Drawing Sheets

LOSSLESS SYNCHRONOUS RECTIFICATION POWER SUPPLY CIRCUIT AND DESIGN METHOD

CROSS-REFERENCES TO RELATED APPLICATIONS

This application claims priority to the following commonly assigned Chinese provisional patent application: Serial No. 202210922482.0, filed on Aug. 2, 2022 and to the following commonly assigned U.S. provisional patent application: Ser. No. 63/383,460 entitled "Lossless Synchronous Rectification Power Supply Circuit And Design Method," filed Nov. 11, 2022 which are each hereby incorporated by reference in their entirety for all purposes.

FIELD

The described embodiments relate generally to synchronous rectifiers. More specifically, the described embodiments relate to a lossless synchronous rectification power supply circuit and design method.

BACKGROUND

Currently there are a wide variety of electronic circuits that convert one form of power to another. The circuits consume power to perform the conversion process. New circuits and method of converting power are needed that reduce the power consumed during the conversion process.

SUMMARY

In some embodiments a circuit is disclosed that has a transformer winding extending between a first lead and a second lead, the second lead is connected to a first output terminal and a solid-state switch is electrically connected between the first lead and a second output terminal. A first capacitor is coupled in series with a second capacitor forming a capacitor circuit that is coupled in parallel with the switch. A controller circuit is arranged to control operation of the switch to be in an off state during a first time period and in an on state during a second time period. During the first time period the second capacitor is charged through the first capacitor where the first capacitor limits the charge of the second capacitor. During the second time period the first capacitor discharges to the second output terminal and the second capacitor supplies power to the controller circuit.

In some embodiments a diode is coupled in series between the first capacitor and the second capacitor and arranged to allow the second capacitor to charge during the first time period and to allow the second capacitor to power the controller during the second time period. A second diode may be coupled in parallel across the switch and arranged to allow the first capacitor to discharge to the second output terminal during the second time period. The first capacitor has a capacitance value defined by the equation:

$$C_{rg1} = \frac{C_{iss} \cdot V_{rg\_cc} + Q_{ic}}{V_{ds} - V_{rg\_cc} - V_F}$$

wherein $C_{rg1}$ is a capacitance of the first capacitor, $C_{iss}$ is a total input capacitance of the controller circuit, $V_{rg\_cc}$ is a desired voltage, $Q_{ic}$ is a total charge to power the controller circuit, $V_{ds}$ is a drain to source voltage of the switch, and $V_F$ is a forward voltage of the diode.

In embodiments the transformer winding has an output polarity that is inverted from an input polarity. The circuit may operate as a flyback converter and the solid-state switch may be a gallium nitride field effect transformer.

In embodiments a method of operating a circuit is disclosed, the method comprising operating the circuit sequentially in a first time period then in a second time period, the circuit comprising a transformer winding extending between a first lead and a second lead, wherein the second lead is connected to a first output terminal. A solid-state switch is electrically connected between the first lead and a second output terminal. A first capacitor coupled in series with a second capacitor forming a capacitor circuit that is coupled in parallel with the switch and a controller is arranged to control operation of the switch such that the switch is in an off state during the first time period causing the second capacitor to charge through the first capacitor and is in an on state during the second time period.

In some embodiments during the first time period the first capacitor limits the charge of the second capacitor. The circuit further comprises a diode coupled in series between the first capacitor and the second capacitor and arranged to allow the second capacitor to charge during in the first time period and to allow the second capacitor to power the controller during the second time period. A second diode is coupled in parallel across the switch and arranged to allow the first capacitor to discharge to the second output terminal during the second time period.

In some embodiments the first capacitor has a capacitance value determined by:

$$C_{rg1} = \frac{C_{iss} \cdot V_{rg\_cc} + Q_{ic}}{V_{ds} - V_{rg\_cc} - V_F}$$

wherein $C_{rg1}$ is a capacitance of the first capacitor, $C_{iss}$ is a total input capacitance of the controller, $V_{rg\_cc}$ is a desired voltage, $Q_{ic}$ is a total charge to power the controller, $V_{ds}$ is a drain to source voltage of the switch, and $V_F$ is a forward voltage of the diode.

In some embodiments the transformer winding has an output polarity that is inverted from an input polarity. In some embodiments the circuit can act as a flyback converter. The solid-state switch can be a gallium nitride-based field effect transistor.

In embodiments a primary winding of a transformer is arranged to be coupled to a power source. A secondary winding of the transformer extends between a first lead and a second lead and the second lead is connected to a first load terminal. A solid-state switch having a source is connected to the first lead and a drain is connected to a second load terminal. A first capacitor is coupled in series with a second capacitor forming a capacitor circuit that is coupled in parallel with the switch. A controller circuit turns the switch off during a first time period and turns the switch on during a second time period. During the first time period the first capacitor supplies power to the second capacitor and to the controller circuit while during the second time period the first capacitor discharges to the second load terminal and the second capacitor supplies power to the controller circuit.

In some embodiments. During the first time period the first capacitor limits a charge of the second capacitor. A diode is coupled in series between the first capacitor and the second capacitor and arranged to allow the second capacitor to charge during the first time period and to allow the second capacitor to power the controller during the second time period. A second diode is coupled in parallel across the switch and arranged to allow the first capacitor to discharge to the second load terminal during the second time period. The solid-state switch can be a gallium nitride-based field-effect transistor.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
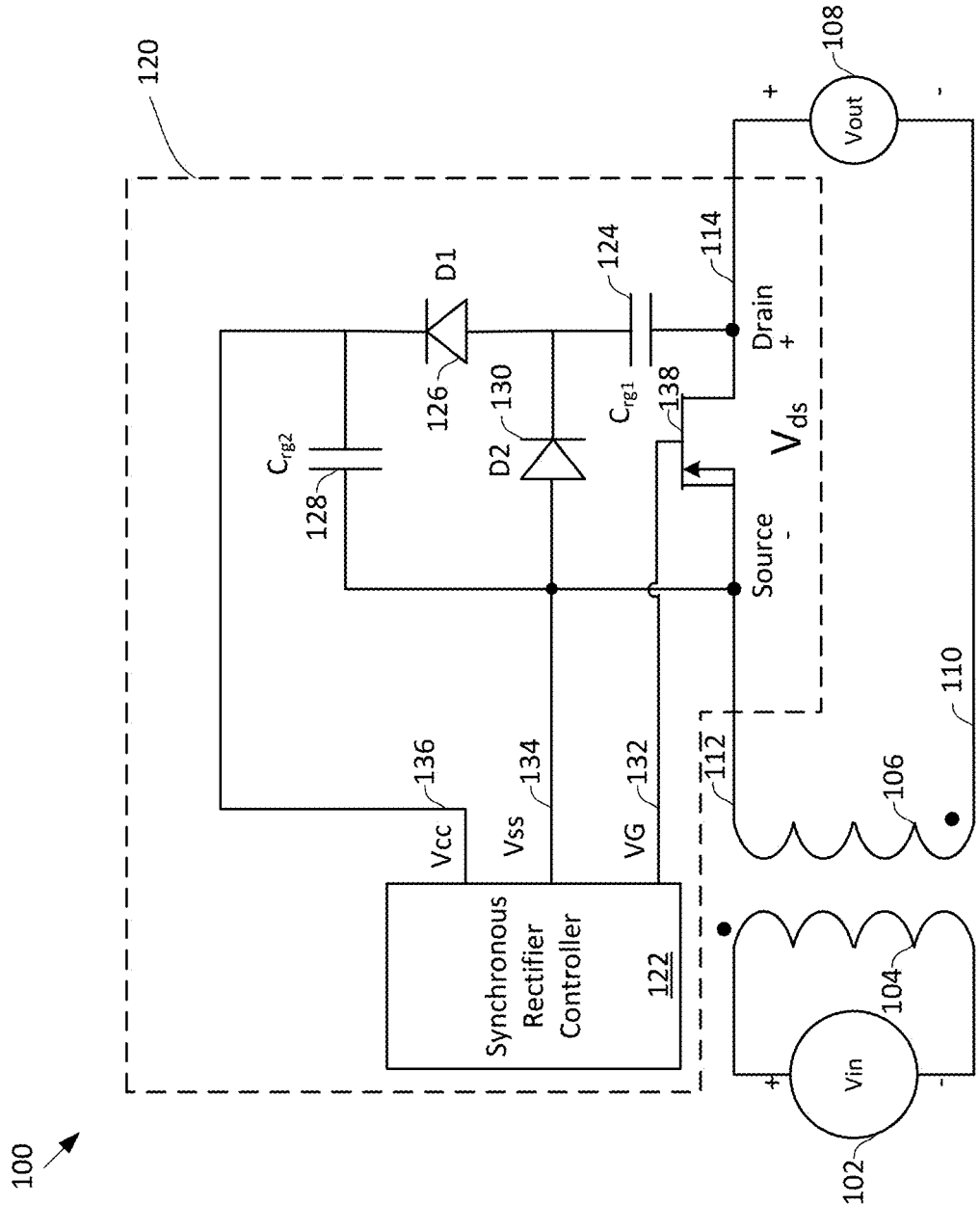
FIG. 1 is a simplified schematic of a low power-loss power supply circuit according to embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques disclosed herein relate generally to power conversion circuits. More specifically, techniques disclosed herein relate to reducing losses in a synchronous rectifier circuit. The circuit uses two regulating capacitors to regulate the supply voltage to a controller that controls the power conversion circuit. A first regulating capacitor supplies a bias voltage that powers the controller. A second regulating capacitor is used to cyclically charge the first regulating capacitor. A diode is used to steer the charge current so that the two capacitors charge in series through a first half cycle of the rectification process while a second diode steers current to discharge the second capacitor during the second half cycle of the rectification process. Various inventive embodiments are described herein, including methods, processes, systems, devices, and the like.

In order to better appreciate the features and aspects of the present disclosure, further context for the disclosure is provided in the following section by discussing one particular implementation of a power conversion circuit with reduced power loss. These embodiments are for explanatory purposes only and other embodiments may be employed in other electronic circuits. For example, embodiments of the disclosure can be used with any type of circuit that uses a controller and can reduce power loss via cyclical charging and discharging of capacitors used to supply power to the controller.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 is a schematic of a power conversion circuit 100. As shown in FIG. 1 the power conversion circuit includes a voltage source 102 that drives a primary winding 104 of a transformer. The transformer has a secondary winding 106 extending between a first lead 110 and a second lead 112. The first lead 110 is connected to a negative rail 144 of an output (Vout) 108 of the power conversion circuit. The second lead 112 is connected to a source terminal 140 of a field effect transistor (FET) 138. FET 138 includes a drain terminal 142 electrically connected to a positive rail 114 of the output (Vout) 108 of the power conversion circuit so the operation of the FET controls power flow from secondary winding 106 to Vout 108.

The operation of FET 138 is controlled by a synchronous rectifier controller 122 that is supplied with power via a low power-loss power supply circuit 120. Power supply circuit 120 includes a first capacitor 124 coupled in series with a second capacitor 128 forming a capacitor circuit that is coupled in parallel with the FET 138. More specifically the drain terminal 142 of FET 138 is connected to the bottom of first capacitor 124 Crg1. The top of first capacitor 124 is connected to the anode of first diode D1 126 and is also connected to the cathode of second diode D2 130. The cathode of first diode D1 is connected to a first side of second capacitor 128 and is also connected to the Vcc power input terminal 136 of the controller 122. The second side of the second capacitor 128 is connected to the anode of second diode D2 130, to the source 140 of FET 138, and to the Vss input terminal 134 of the controller 122. A gate terminal 146 of FET 138 is connected to the output terminal VG 132 of the controller 122. Vss is the source common voltage and is used as the "common point" for the synchronous rectifier controller. It is connected to the source of the FET used as a switch that is synchronously controlled.

Controller 122 is arranged to control operation of the FET 138 such that is in an off state during a first time period and in an on state during a second time period, as described in more detail below. The operation of the FET 130 between the two states controls power flow to Vout 108 and simultaneously operates power supply circuit 120 that supplies the controller 122 with power. The general operation of the power supply circuit 120 is as follows. During the first time period the second capacitor 128 is charged through the first capacitor 124 such that the first capacitor 124 limits the charge of the second capacitor 128 so that it receives just enough power to operate the controller circuit until it is recharged. During the second time period the first capacitor 124 discharges to the positive rail 114 of Vout 108 and the second capacitor 128 supplies power (VCC) 136 to the controller 122. VCC is the power supply voltage for the Synchronous Rectifier Controller 122.

The more detailed operation of the power supply circuit 120 is as follows. The input power source Vin 102 is an alternating source such that during a first time period Vin 102 is positive and a during a second time period Vin 102 is negative. During the first time period, Vin is positive and therefore the output of the secondary winding 106 is negative. During the first time period the FET 138 is off (e.g., in a non-conducting state) and the source 140 is negative with respect to the drain 142. With a positive drain to source voltage the first capacitor 124 and and the second capacitor 128 charge with first diode D1 126 forward biased allowing current to flow. The first capacitor 124 is selected to limit the charge of the second capacitor 128 so it is charged just enough to power the controller 122 until it is recharged. During the first time period second diode D2 130 is reverse biased, blocking current flow.

During the second time period Vin becomes negative so the secondary winding 106 is positive. The controller 122 transmits an output signal VG 132 forcing the FET 138 into an on (e.g., conducting) state. The voltage between drain 142 and source 140 is low and the second diode D2 130 forward biases allowing current to flow. The first capacitor 124 discharges to Vout 108. The second capacitor discharges through the input Vcc 136 of the controller 122. The cycle is then repeated, recharging the first and second capacitors 124, 128, respectively.

Figure 2A:
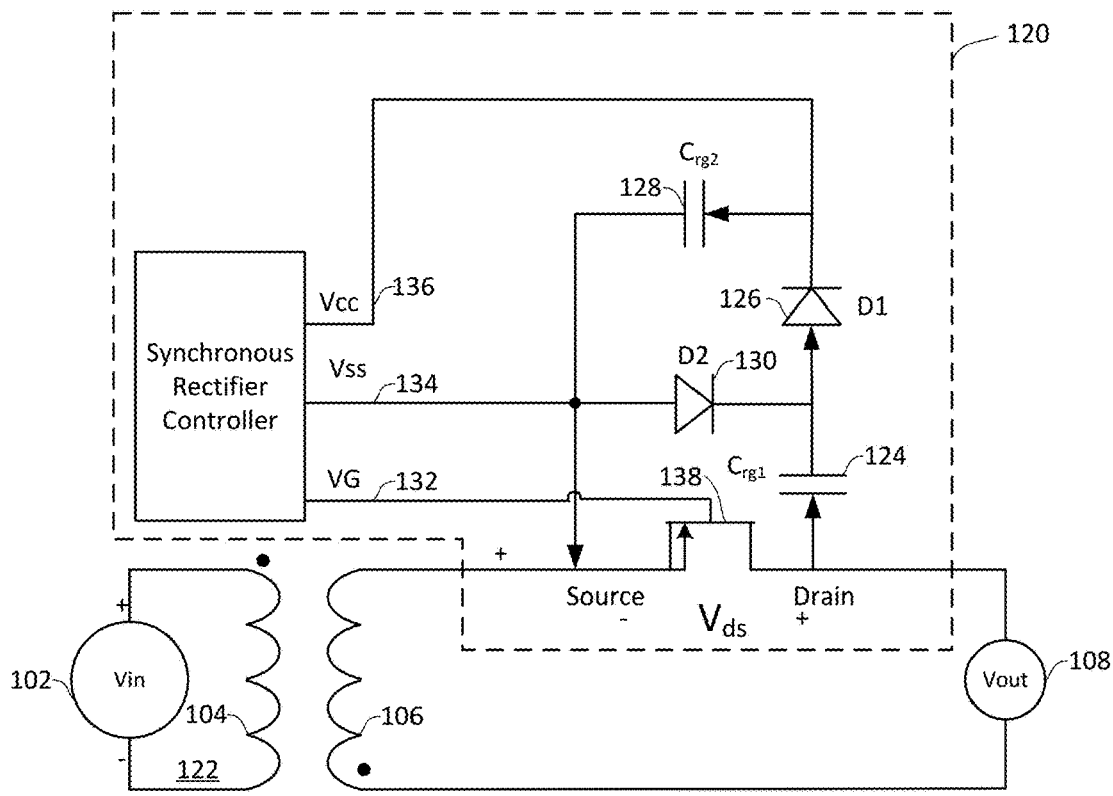
FIG. 2A is the schematic of FIG. 1 showing current flow during a first time period T1.
Figure 2B:
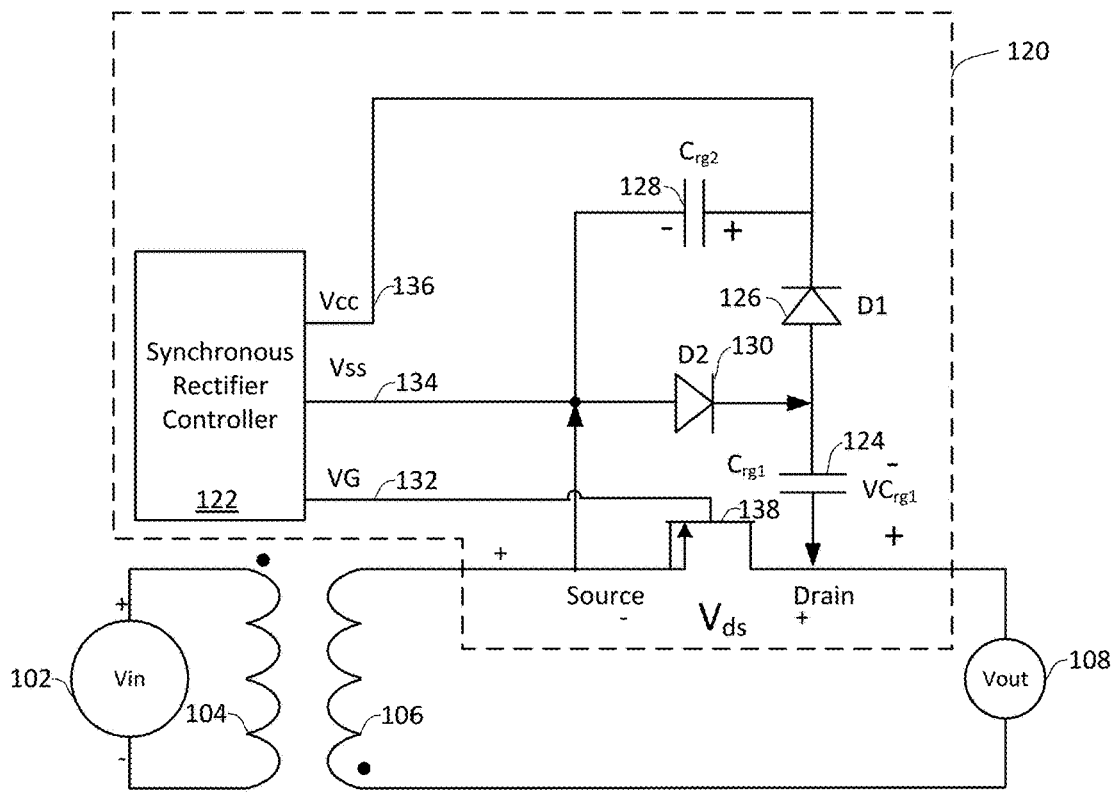
FIG. 2B is the schematic of FIG. 1 showing current flow during a second time period T2.
Figure 3:
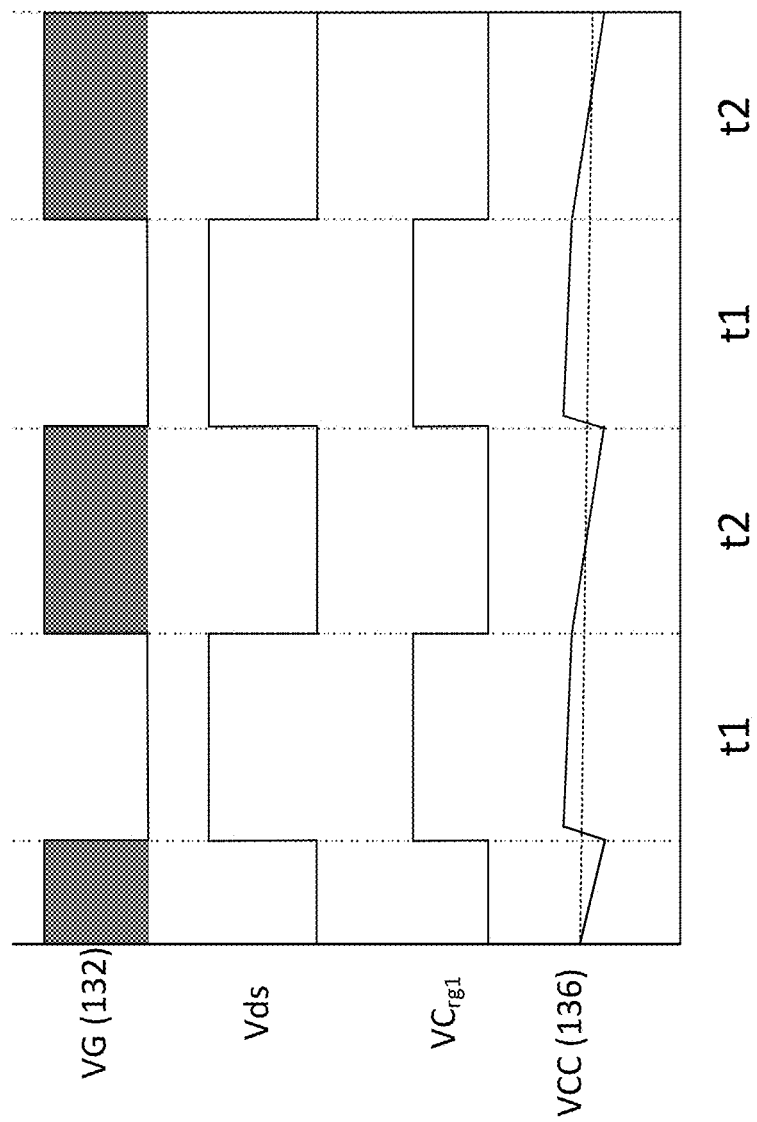
FIG. 3 shows a simplified timing diagram for the power supply circuit shown in FIG. 1 for the first and second time periods T1 and T2, respectively.

FIG. 2A is the circuit of FIG. 1 showing the current flow during the first time period T1, FIG. 2B is the circuit of FIG. 1 showing the current flow during the second time period T2 and FIG. 3 is a timing diagram showing various voltages within the circuit of FIG. 1 during the first and second time periods.

As shown in FIG. 2A, during the first time period current flows into the first and second capacitors 124, 128, respectively, such that they are both charged. More specifically, the current flows from the drain of FET 138 through first capacitor 124 through forward biased first diode D1 126, through second capacitor 128 and then to the source of FET 138. Second diode D2 130 is reverse biased such that it blocks current flow.

As shown in FIG. 2B, during the second time period first capacitor 124 is discharged such that current flows into Vout 108. More specifically, current flows from the source of FET 138 through forward biased second diode D2 130 then through the first capacitor 124 back to the drain of the FET 138, discharging the first capacitor.

As shown in FIG. 3 during time period T1 the output terminal VG 132 is low so that the FET 138 is in an off state. This results in a high drain to source voltage across FET 138 Vds and the voltage across the first capacitor 124 is high because it is in a charged state. The input voltage Vcc 136 which is the voltage across the second capacitor 128 is high because it has been charged along with the first capacitor 124.

During period T2 controller 122 transmits an output signal VG 132 to FET 138 turning the FET on such that is has a low drain to source voltage. The voltage across first capacitor 124 is low because it has discharged and the input voltage Vcc 136, which is also the voltage across the second capacitor 128 slowly decays. The charge stored in the second capacitor 126 is being used to supply current to power controller 122. The operation of the power supply circuit 120 is designed to maintain a relatively low input voltage Vcc 236 by limiting the charging of the second capacitor 128 to reduce power loss.

Figure 4:
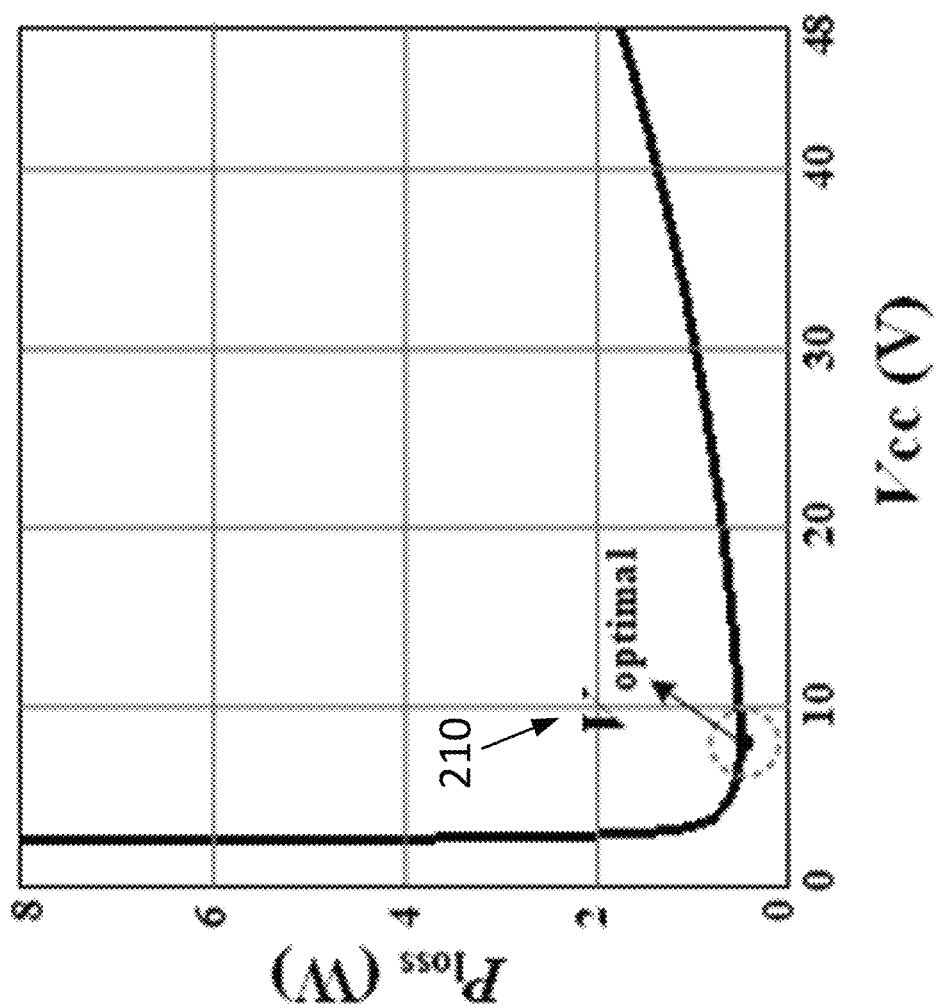
FIG. 4 shows a simplified graph of the power loss of the power supply circuit of FIG. 1 as a function of Vcc.

FIG. 4 shows a curve of the power loss of a synchronous rectifier circuit in watts as a function of Vcc. Vcc is the power input for the synchronous rectifier controller. As shown in FIG. 4, the power loss curve shows a minimal power loss at a voltage $V_{optimal}$ 210. The curve shows the strong dependency on the value of Vcc and the driving losses. The total loss of the synchronous rectifier circuit (Ploss) includes conduction loss ($P_{on}$), driving loss ($P_{dr}$) and IC loss ($P_{ic}$), which can be described using equation (1) as:

$$P_{loss}=P_{on}+P_{dr}+P_{ic} \quad \text{Equation (1)}$$

Wherein Pon is conduction loss of the synchronous rectifier FET (138), Pdr is the driving loss and $P_{ic}$ is the working loss of the synchronous rectifier controller 122. The driving loss of the can be calculated using equation 2 as follows:

$$P_{dr}=C_{iss}*Vcc^2*f_{sw} \quad \text{Equation (2)}$$

Wherein Ciss is the total input capacitance of the synchronous controller, Vcc is the supply voltage of the synchronous rectifier controller and $f_{sw}$ is the switching frequency. The driving loss is dependent on the value of Vcc. The larger Vcc is the higher the driving loss. Ploss can be calculated as:

$$P_{loss}(Vcc)=I_d^2*R_{dson}(Vcc)+C_{iss}*Vcc^2*F_{sw}+P_{ic} \quad \text{Equation (3)}$$

FIG. 4 shows that the lowest power loss occurs with a Vcc value of approximately 9V. In the low power-loss supply circuit 120 the value of Vcc is dependent on the value of first capacitor Crg1 124. The value for first capacitor Crg1 that gives us the optimal voltage 210 is:

$$C_{rg1} = \frac{C_{iss} \cdot V_{rg\_cc} + \overline{Q}_{ic}}{V_{ds} - V_{rg\_cc} - V_F} \qquad \text{Equation (4)}$$

$V_{rg\_cc}$ is the optimal voltage Voptimal 210, the voltage that yields the lowest power loss. $Q_{ic}$ is equivalent charge required to maintain normal operation of the synchronous rectifier controller. $V_{ds}$ is the drain to source voltage of the FET. $V_F$ is the forward drop of the first diode D1 126.

Figure 5:
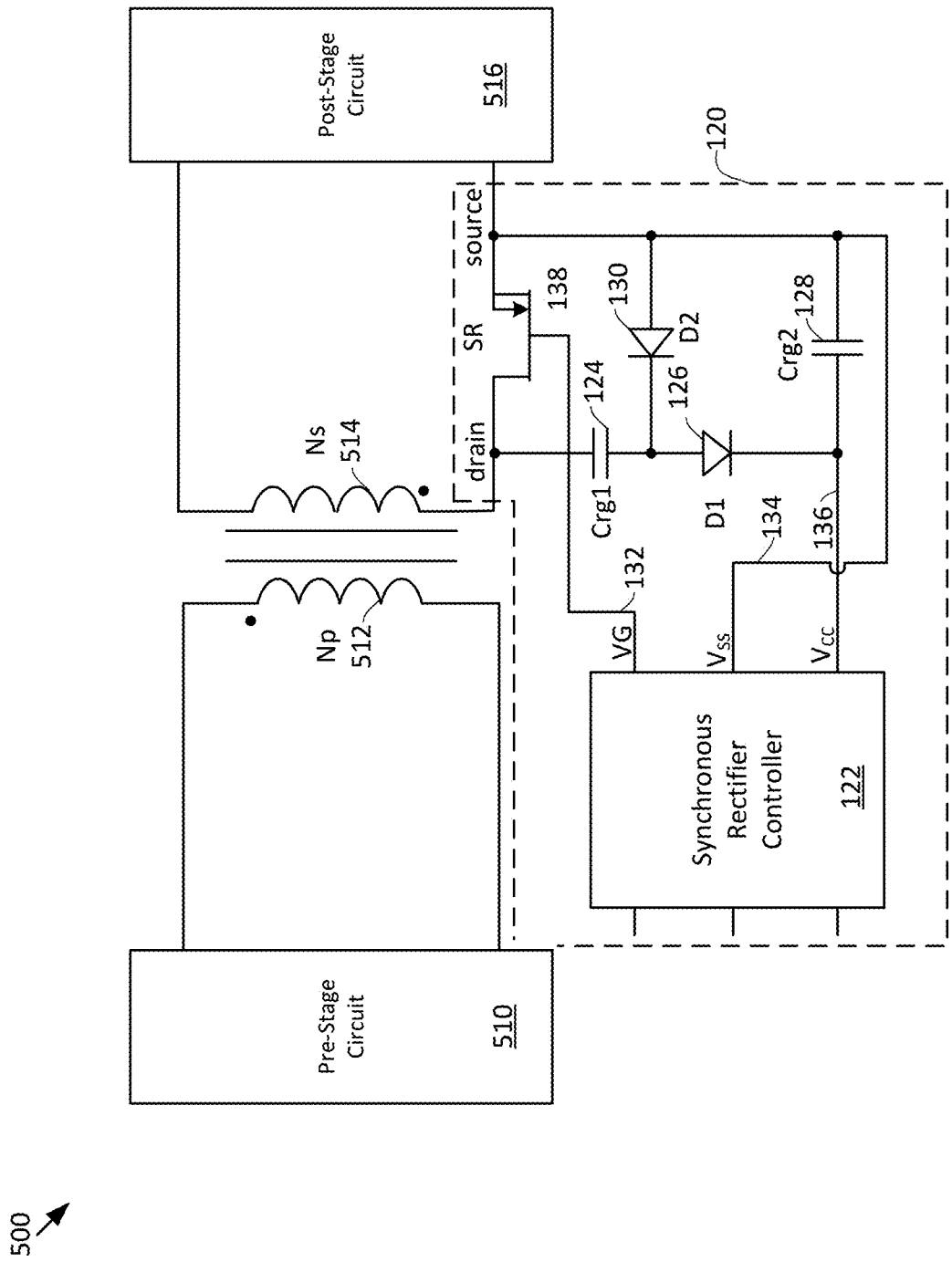
FIG. 5 is a simplified schematic of a low side anti-coupled synchronous rectifier circuit according to embodiments of the disclosure.

FIG. 5 shows an illustration of a low side anti-coupled synchronous rectifier 500. As shown in FIG. 5 a pre-stage circuit 510 drives the primary winding Np 512 of a transformer that has a secondary Ns 514 that drives a post stage circuit 516. The bottom of the secondary is connected to the low power-loss supply circuit 120. The transformer secondary winding Ns 514 is the opposite polarity of the primary winding Np 512. It has an anti-coupling relationship. The low power-loss supply circuit 120 is connected to the low side of the secondary winding Ns 514. This configuration may be useful for flyback converters, active clamp flyback converters, dual tube flyback converters and asymmetric half bridge converters, among other suitable types of converters. Calculation of the capacitance value for an optimal Vcc is given by equation 4.

Figure 6:
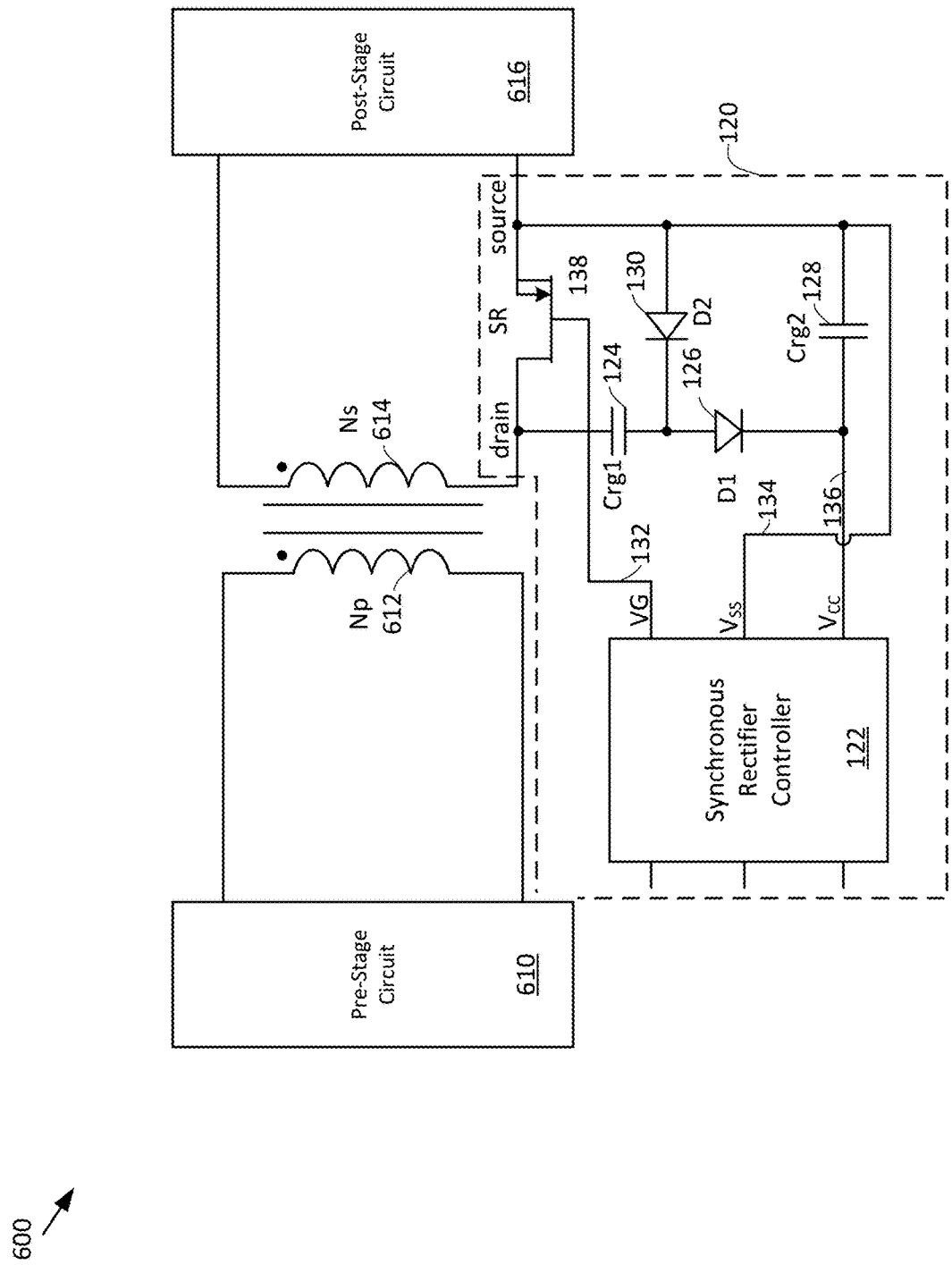
FIG. 6 is a simplified schematic of a low side positively coupled synchronous rectifier circuit according to embodiments of the disclosure.

FIG. 6 shows an illustration of a low side positively coupled synchronous rectifier 600. As shown in FIG. 6, a pre stage circuit 610 drives the primary winding Np 612 of a transformer that has a secondary Ns 614 that drives a post stage circuit 616. The bottom of the secondary Ns 614 is connected to the low power-loss supply circuit 120. The transformer secondary winding Ns 614 is the same polarity of the primary winding Np 612. It has positive coupling from the primary. The low-power loss supply circuit is connected to the low side of the secondary winding Ns 614. This configuration is useful for forward converters, dual tube and LLC converters. Calculation of the capacitance value for an optimal Vcc is given by equation 4.

Figure 7:
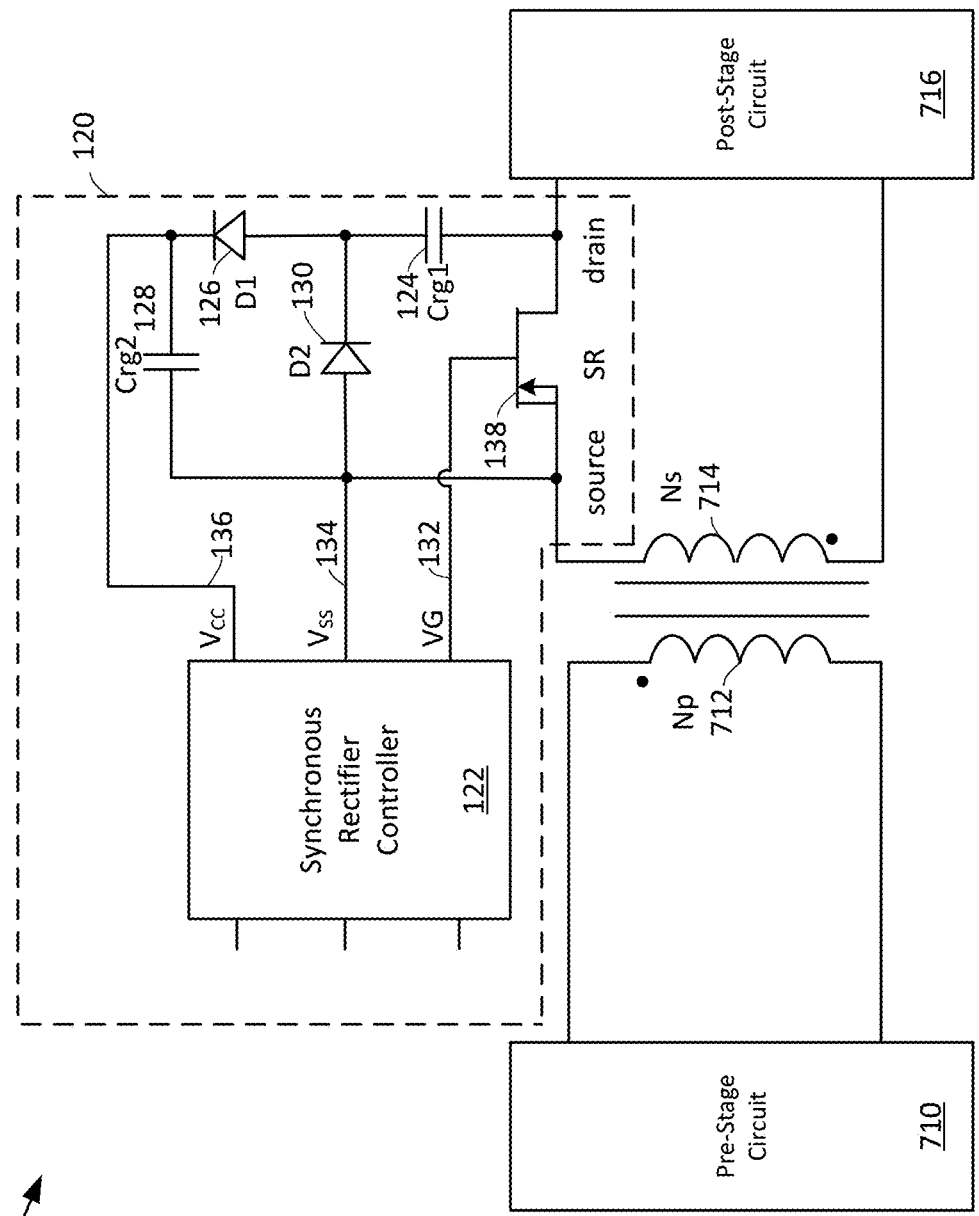
FIG. 7 is a simplified schematic of a high side anti-coupled synchronous rectifier circuit according to embodiments of the disclosure.

FIG. 7 shows an illustration of a high side anti coupled synchronous rectifier 700. As shown in FIG. 7, a pre stage circuit 710 drives the primary winding Np 712 of a transformer that has a secondary Ns 714 that drives a post stage circuit 716. The top of the secondary Ns 714 is connected to the low power-loss supply circuit 120. The transformer secondary winding Ns 714 is the opposite polarity of the primary winding Np 712 so it is anti-coupling configuration. The low power-loss supply circuit 120 is connected to the high side of the secondary winding Ns 714. This configuration is useful for flyback converters, active clamp flyback converter, dual tube flyback converters and asymmetric half bridge converters, among other suitable types of converters. Calculation of the capacitance value for an optimal Vcc is given by equation 4.

Figure 8:
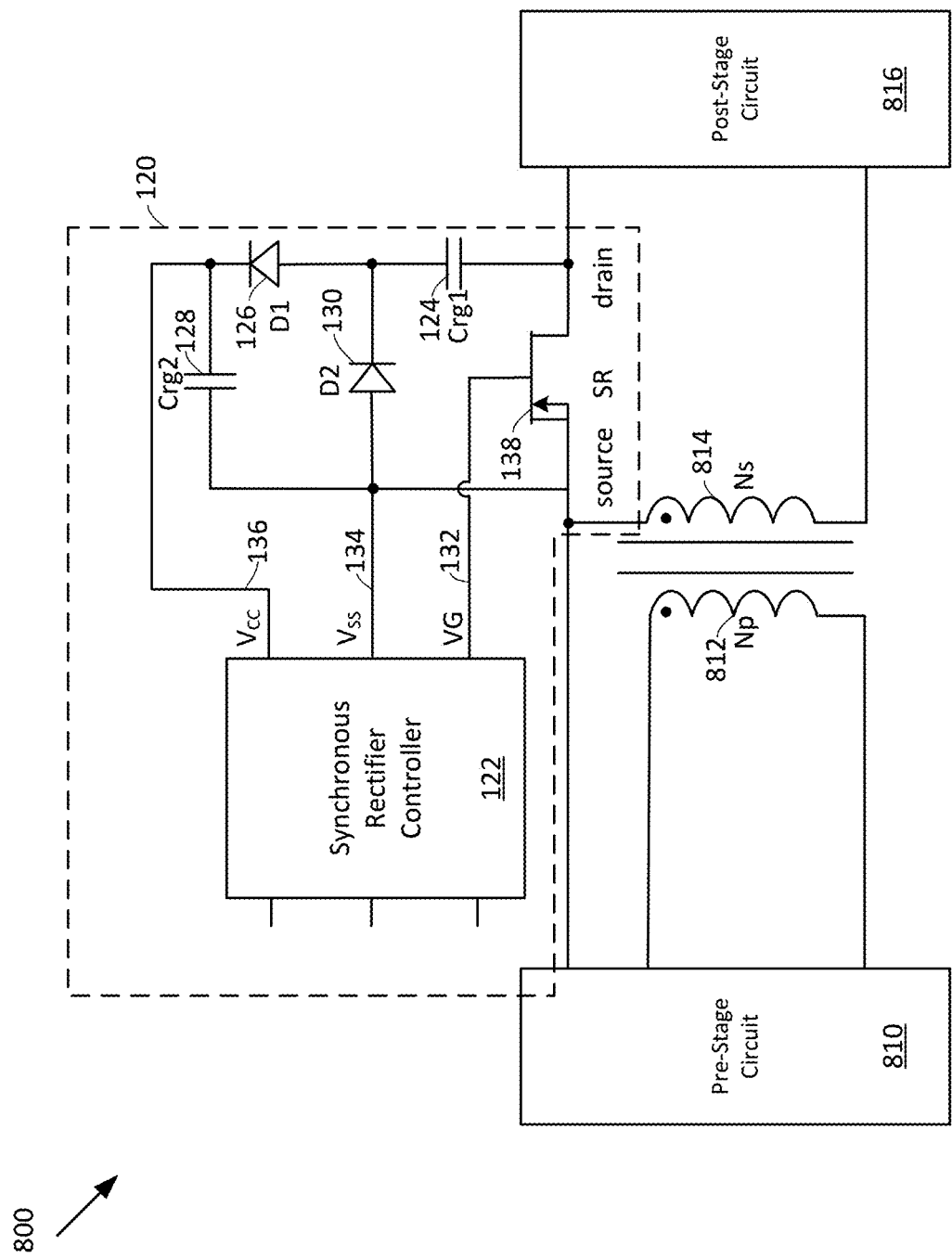
FIG. 8 is a simplified schematic of a high side positively coupled synchronous rectifier circuit according to embodiments of the disclosure.

FIG. 8 shows an illustration of a high side positively coupled synchronous rectifier 800. As shown in FIG. 8, a pre stage circuit 810 drives the primary winding Np 812 of a transformer that has a secondary Ns 814 that drives a post stage circuit 816. The top of the secondary Ns 814 is connected to the low power-loss supply circuit 120. The transformer secondary winding Ns 814 is the same polarity of the primary winding Np 812. The secondary winding Ns 814 has positive coupling from the primary. The low power-loss supply circuit 120 is connected to the high side of the secondary winding Ns 814. This configuration may be useful for forward converters, double tube and LLC converters, among other suitable types of converters. Calculation of the capacitance value for an optimal Vcc is given by equation 4.

Figure 9:
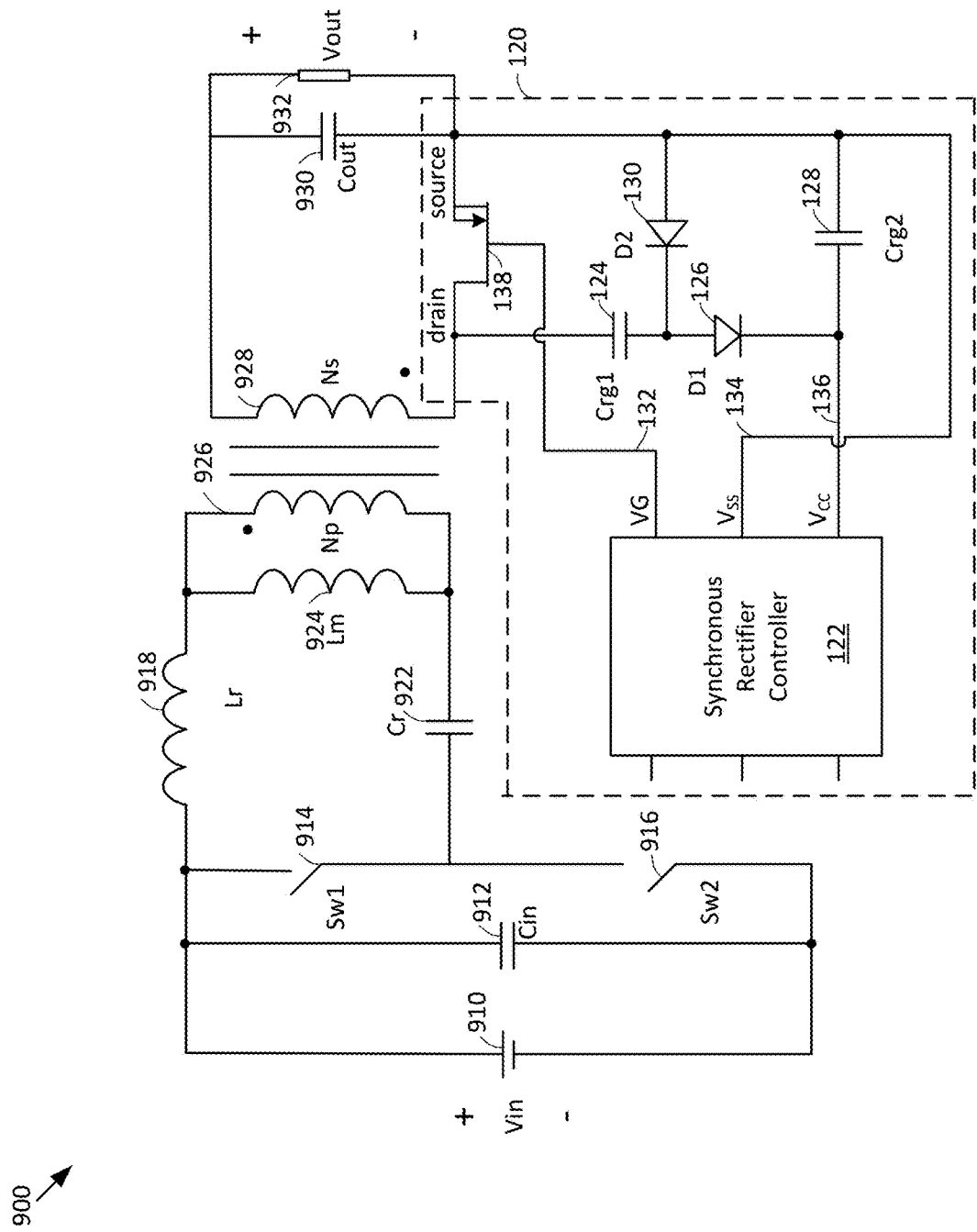
FIG. 9 is a simplified schematic of an asymmetric half-bridge flyback converter circuit according to embodiments of the disclosure.

FIG. 9 is a schematic of an asymmetric half-bridge flyback converter 900. As shown in FIG. 9, the flyback converter 900 includes an input voltage Vin 910 with an input capacitance Cin 912. A switch Sw1 914 is connected in series with a switch Sw2 916 and is connected in parallel with the input Vin 910 and capacitor Cin 912. The top of switch Sw1 914 is connected on one side to an inductor Lr 918. Inductor Lr 918 is also connected on its opposite side to the primary winding of a transformer Np 926 in parallel with an external inductor Lm 924 which represents the magnetization inductance of the primary winding. The opposite end of the primary winding Np 926 is connected to a capacitor Cr 922. The opposite side of capacitor Cr 922 is connected to the bottom of switch Sw1 914 and the top of switch Sw2 916. The bottom of switch Sw2 916 is connected to the negative rail of Vin 910. The top of switch Sw1 914 is connected to the positive rail of Vin 910. The secondary Ns 928 is connected to the synchronous rectifier circuit 120 on the secondary low side. The high side of the secondary winding is connected to Cout 930 and to the positive rail of Vout 932. The other end of the secondary winding Ns 928 is connected to the drain of FET 138 from the low power-loss supply circuit 120. The source of FET 138 of circuit 120 is connected to the negative rail of Vout 932 and the output capacitor 930.

The half bridge flyback circuit of FIG. 9 operates as follows. When Vin is positive switch S2 916 is closed and switch Sw1 914 is open. Current flows through the capacitor Cr 922, the primary winding Np 926, and Lr 918 causing the secondary winding to swing negative. When Vin is negative, the switch Sw2 is opened and switch Sw1 is closed to allow the resonant current to continue to flow. The secondary output swings positive which causes the secondary Ns 928 to swing positive. The low power-loss supply circuit 120 behaves as previously described. During the time that the output of the secondary Ns 928 is negative The FET is open matching the first time period T1 FIG. 3. Conversely, when the output of the secondary Ns 928 is positive the FET is a short circuit representing the second time period T2 (FIG. 3) for the low power-loss supply circuit 120.

In order to highlight the technical advantages of the embodiments, the synchronous rectification low power-loss supply circuit 120 of FIG. 9 is applied to a fast-charging source of USB PD3.1. The main circuit topology is an asymmetrical half-bridge flyback converter. The variation range of an output voltage $V_o$ is 5 V to 48 V, the variation range of an input bus voltage $V_{in}$ is 300 V to 380 V, the effective value of an output current is 12 A, and a ratio of turns between the primary and secondary windings of the transformer is 6:1. In this type of circuit a 100 V MOSFET is commonly used and is selected. The MOSFET total input capacitance $C_{iss}$ is 5 nF. The synchronous rectification control chip is also a commonly used model in the industry, in which an operating current $I_{ic}$ of its internal logic circuit is about 600 uA with a switching frequency $f_{sw}$ is 100 kHz. Therefore, the total loss $P_{loss}$ of the synchronous rectifier circuit can be further rewritten as formula (5):

$$P_{Loss}(\text{Vcc}) = I_d^2 \cdot R_{dson}(\text{Vcc}) + C_{iss} \cdot \text{Vcc}^2 \cdot f_{sw} + I_{ic} \cdot \text{Vcc} \qquad \text{Equation (5)}$$

Where $I_d$ is current through the switching device, $R_{dson}$ is the on resistance of the switch, Vcc is the supply voltage for the Synchronous Rectifier Controller, Ciss is the MOSFET input capacitance, $f_{sw}$ is the switching frequency, $I_{ic}$ is the supply current for the Synchronous Rectifier controller.

According to formula (1), the change curve of the total loss $P_{loss}$ of the synchronous rectifier circuit with the supply voltage Vcc can be obtained, as shown in FIG. 4. It can be seen from the figure that when the supply voltage Vcc=V$_{optimal}$=9 V 210, the total loss P$_{loss}$ of the synchronous rectifier circuit has a minimum value.

In a typical synchronous rectifier circuit the amplitude of the supply voltage Vcc is equal to the output voltage V$_o$, that is, Vcc=V$_o$. Therefore, according to formula (1), it can be obtained that if V$_o$=28 V, P$_{loss}$=0.896 W, and if V$_o$=48 V, P$_{loss}$=1.744 W. In common synchronous rectifiers the power supply voltage Vcc of the synchronous rectifier circuit cannot be adjusted, and changes with the amplitude of the output voltage V$_o$. However, in USB PD3.1, the maximum output voltage is 48 V, resulting in a very high total loss P$_{loss}$ of the synchronous rectifier circuit.

Using the circuit of FIG. 9 a second capacitor Crg2 128 is taken as 1 µF. In the present embodiment, a set value of a power supply voltage is designed to be close to V$_{optimal}$ 210 by means of designing the capacitance value of the regulating first capacitor Crg1 124, and a control equation for the regulating first capacitor Crg1 124 is:

$$C_{rg1} = \frac{C_{iss} \cdot V_{rg\_cc} + \frac{I_{ic}}{f_{sw}}}{\frac{N_s V_{in}}{N_p} - V_{rg\_cc} - V_F}$$

Equation (6)

Where V$_{rg\_cc}$ is the voltage Vcc 136 that supplies power to the synchronous rectifier controller 122 device. I$_{ic}$ is the current consumption of the synchronous rectifier controller. It can be seen from FIG. 4 that the synchronous rectification chip has an optimal operating voltage V$_{optimal}$ of about 9 V. Therefore, letting V$_{rg\_cc}$=9 V and V$_{in}$=300 V, it can be obtained that the capacitance value of the regulating first capacitor Crg1 124 is 1.25 nF. According to formula (1), the loss of the synchronous rectifier circuit of the present invention can be calculated. When V$_{in}$=300 V, and V$_o$=28 V or 48 V, P$_{loss}$=0.52 W; and when V$_{in}$=380 V, and V$_o$=28 V or 48 V, P$_{loss}$=0.563 W. Therefore, the loss of the synchronous rectifier circuit can be greatly reduced by using the low power-loss supply circuit provided by the present invention. The present invention has great potential for the application of PD3.1.

Figure 10:
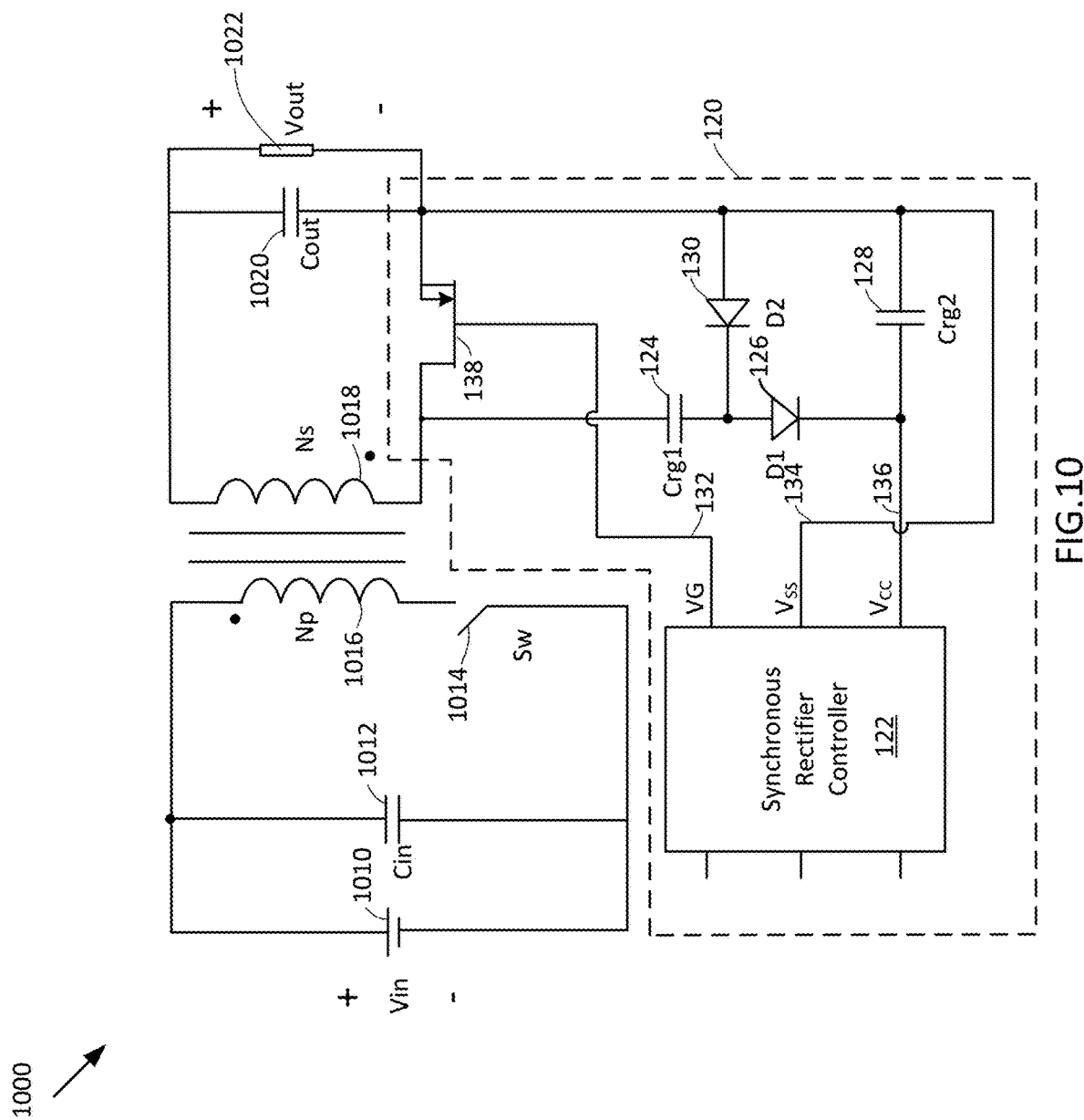
FIG. 10 is a simplified schematic of a flyback converter circuit according to embodiments of the disclosure.

FIG. 10 is a schematic of a flyback converter 1000. As shown in FIG. 10 an input voltage source Vin 1010 is connected in parallel with an input capacitance 1012. The top of Vin 1010 is connected to the top of a primary winding Np 1016. The bottom of primary winding Np 1016 is connected to the top of switch 1014. The bottom of switch 1014 is connected to the negative side of Vin 1010 and the bottom of capacitor 1012. The transformer secondary Ns 1018 is connected on the high side to the positive rail of Vout 1022 and connected to the top of Cout 1020. The low side of secondary winding 1018 is connected to circuit 120 by connecting to the drain of FET 138. The source of FET 138 is connected to the low side of Vo 1022 and the bottom of Cout 1020.

The converter shown in FIG. 10 1000 operates as follows. When Vin is positive switch SW 1014 is closed and the output of the secondary Ns 1018 will be negative. This corresponds to first time period T1 for the low power-loss supply circuit 120. When the input Vin 1010 is negative the output of the secondary is positive and corresponds to time period T2 for the low power-loss supply circuit 120. Selection for the value of first capacitor Crg1 124 can be calculated using equation (6).

Figure 11:
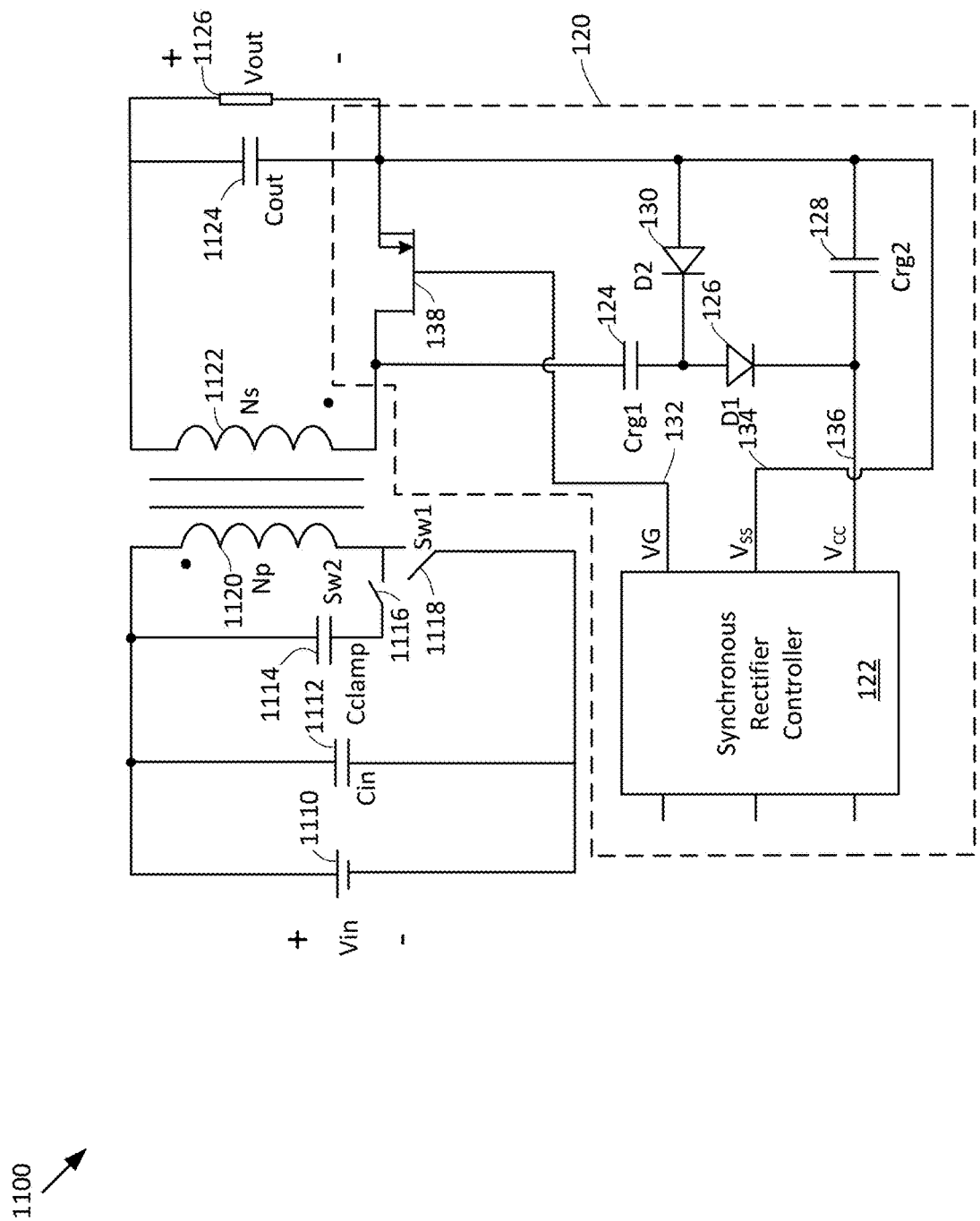
FIG. 11 is a simplified schematic of an active clamp flyback converter circuit according to embodiments of the disclosure.

FIG. 11 is a schematic of active clamp flyback converter 1100. As shown in FIG. 11 an input voltage source Vin 1110 is connected in parallel with Cin 1112. The plus side of Vin 1110 is connected to the top of Cclamp capacitor 1114 and is also connected to the top of primary winding NP 1120. The bottom of primary winding Np 1120 is connected to the top of switch Sw1 1118 and is also connected to one side of switch Sw2 1116. The other side of switch 1116 is connected to the bottom of capacitor Cclamp 1114. The bottom of switch Sw1 1118 is connected to the minus side of Vin 1110 in parallel with capacitor 1112. The secondary Ns 1122 is connected on the high side to the positive rail of Vout 1126, and Cout 1124. The low side of the secondary winding Ns 122 is connected to the drain of FET 138 of the low power-loss supply circuit 120. The source of FET 138 is connected to the negative rail of Vout 1126 and the bottom of Cout 1124.

The active clamp flyback converter 1100 operates as follows. When input voltage Vin 1110 is positive switch Sw1 1118 is closed and switch Sw2 1116 is open. The secondary output becomes negative and represent time period T1 for the low power-loss supply circuit 120. When the input voltage Vin 1110 becomes negative the switch Sw1 opens and switch Sw2 closes. Sw2 closes to absorb the energy contained in the primary winding leakage inductance. The output of the secondary Ns 1122 is positive and represents the second time period T2. The value of first capacitor Crg1 124 may be determined using equation (6).

Figure 12:
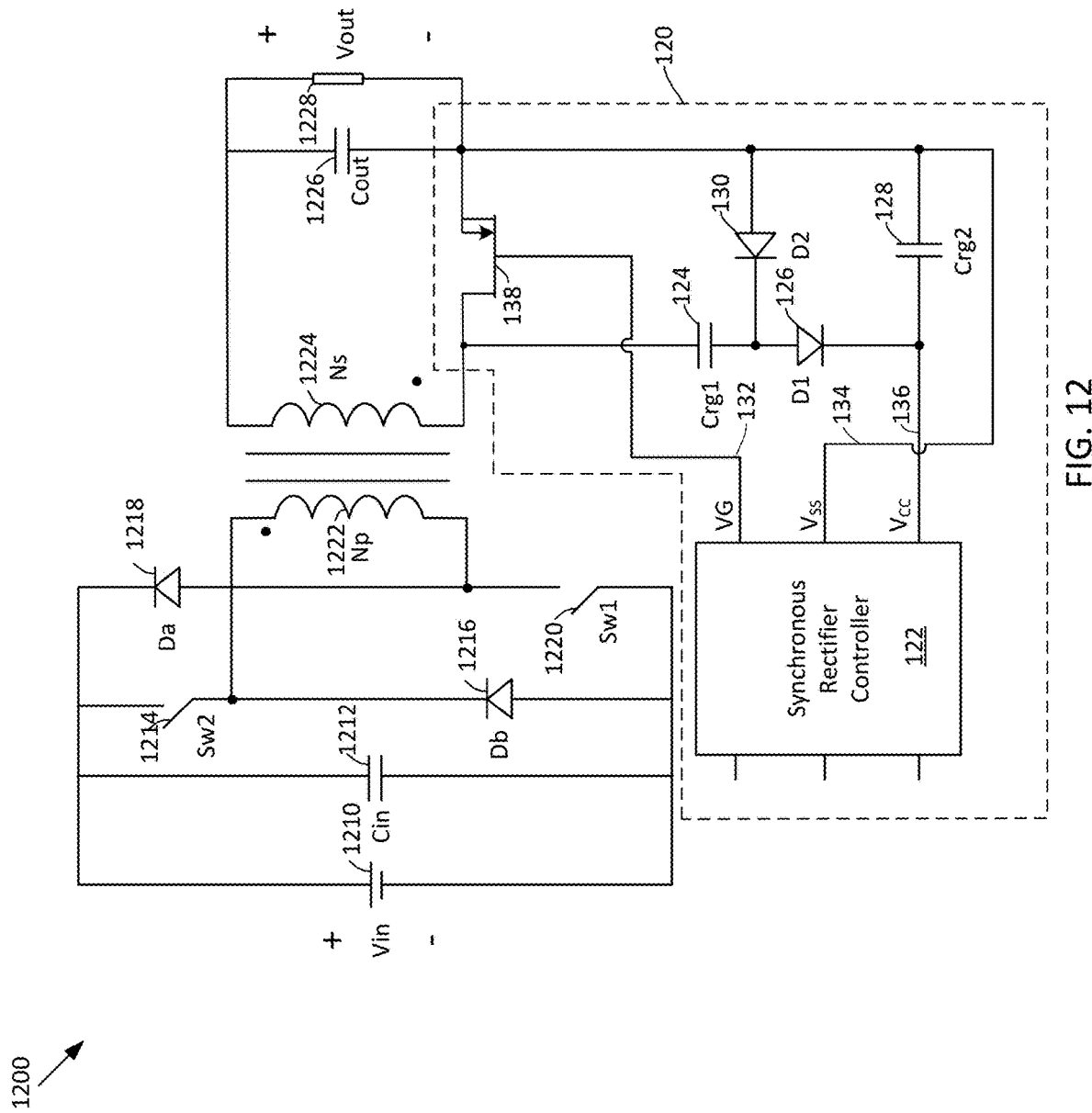
FIG. 12 is a simplified schematic of a double tube flyback converter circuit according to embodiments of the disclosure.

FIG. 12 is a schematic of a double tube flyback converter 1200. As shown in FIG. 12 an input Vin 1210 is connected in parallel with capacitance Cin 1212. The positive rail of Vin 1210 is connected to the top of switch 1214 and the cathode of diode Da 1218. The bottom of switch Sw2 1214 is connected to the top of primary winding Np 1222 and is also connected to the cathode of diode Db 1216. The anode of diode Da 1218 is connected to the bottom of primary winding Np 1222 and is connected to the top of switch Sw1 1220. The bottom of switch Sw1 1220 is connected to the anode of diode Db 1216 and the negative rail of Vin 1210. The high side of the secondary winding Ns 1224 is connected to the positive rail of Vout 1228 in parallel with Cout 1226. The low side of secondary winding Ns 1224 is connected to the drain of FET 138 which is part of the low power-loss supply circuit 120. The source of FET 138 is connected to the negative rail of Vout 1228 in parallel with output capacitor 1226.

The double tube flyback converter 1200 operates as follows. When the input voltage Vin 1210 is positive witches Sw1 1220 and switch Sw2 1214 close causing current to flow through the primary winding Np 1222. The secondary output will be negative so that the low power-loss supply circuit 120 is in the first time period T1. The FET 138 is open. When Vin becomes negative the switches Sw1 1220 and Sw2 1214 open and the secondary Ns 1222 output becomes positive and the low power-loss supply circuit 120 is in the second time period T2. The FET 138 shorts and the secondary Ns 1224 is applied across the output Vout 1228. The value of first capacitor Crg1 can be calculated using equation (6).

Figure 13:
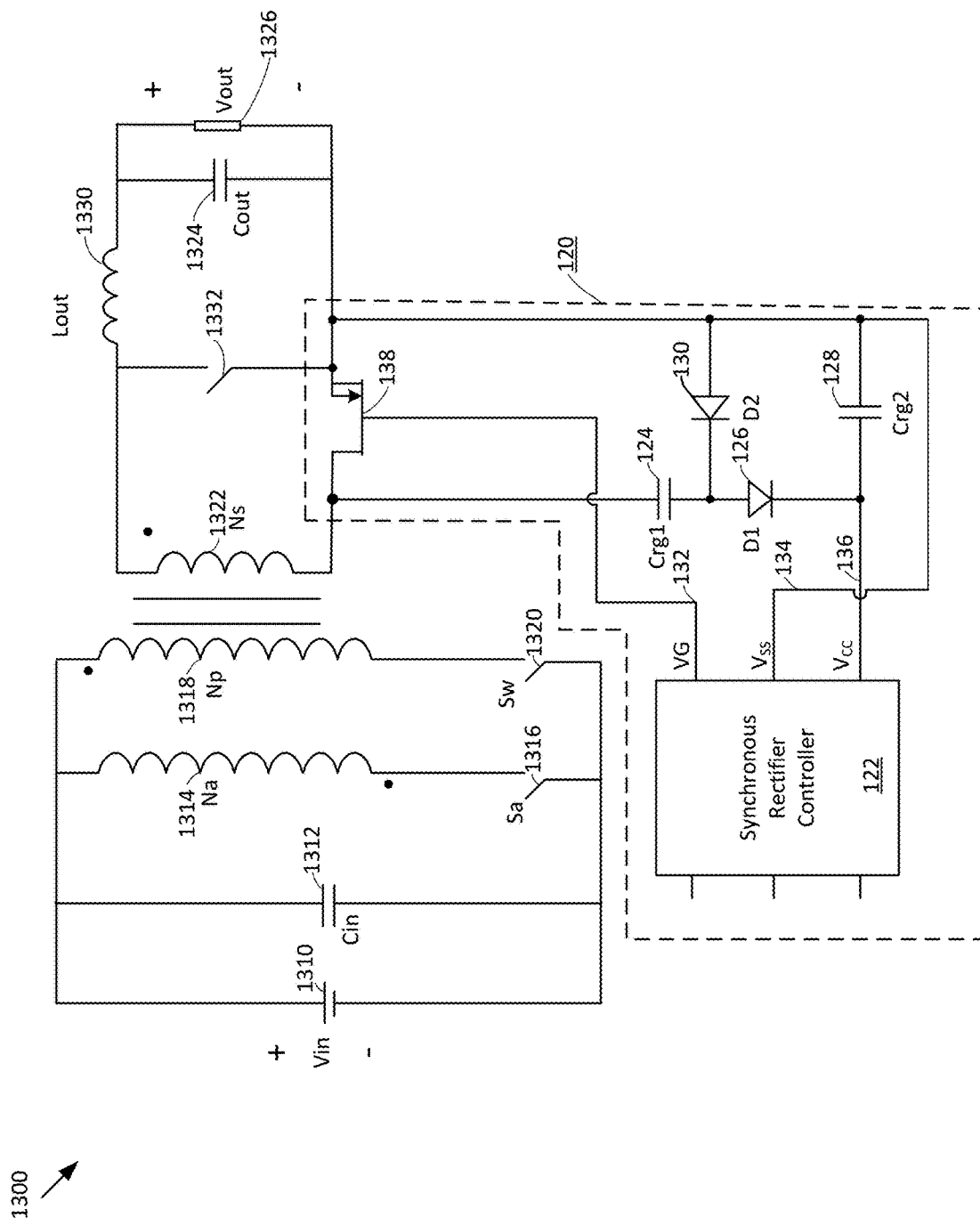
FIG. 13 is a simplified schematic of a forward converter using a synchronous rectifier circuit according to embodiments of the disclosure.

FIG. 13 is a schematic of a forward converter using a synchronous rectifier circuit 1300. As shown in FIG. 13, circuit 1300 has an input Vin 1310 connected in parallel to the input capacitor Cin 1312. Vin 1310 has a plus rail that is connected to the top of demagnetizing winding Na 1314 and the top of primary winding Np 1318. The negative rail of Vin 1310 in parallel with Cin 1312 is connected the bottom of switch Sa 1316 and is also connected to the bottom of switch Sw 1320. The top of switch Sa 1316 is connected to the bottom of demagnetizing winding Na 1314. The top of switch Sw 1320 is connected to the bottom of primary winding Np 1318. The top of secondary winding Ns 1322 is connected to one side of inductor Lout 1330 and to the top of switch 1332. The other side of Lout 1330 is connected to the positive rail of Vout 1326 in parallel with Cout 1324. The bottom of switch 1332 is connected to the source of FET 138. The other end of secondary winding Ns 1322 is connected to the drain of FET 138 part of the low-power supply circuit 120. The source of FET 138 is connected to the negative rail of Vout 1326 and Cout 1324.

The circuit in FIG. 13 is a forward converter, however, in other embodiments other suitable circuit architectures can be used. When the input Vin 1310 is positive the switch Sw 1320 is closed the current in the primary winding Np 1318 is transferred to the secondary. The secondary is positive and the circuit 120 is in the second time period T2 condition. The FET 138 is closed, and the voltage of the secondary drives the inductor Lout 1330 which in turn drives Vout 1326. When the switch Sw 1320 opens the low power-loss supply circuit 120 is in the first time period so that the FET 138 is open. Switch 1332 is closed during this time period as a freewheeling device for Lout 1330. Switch Sa is closed so that any leakage inductance current drives the demagnetization winding Na 1314. Determining the value for first capacitor Crg1 is given by the equation:

$$C_{rg1} = \frac{C_{iss} \cdot V_{rg\_cc} + \bar{Q}_{ic}}{\frac{N_A V_{in}}{N_p} - V_{rg\_cc} - V_F}$$ Equation (7)

Where Na is the number of turns of the demagnetizing winding.

Figure 14:
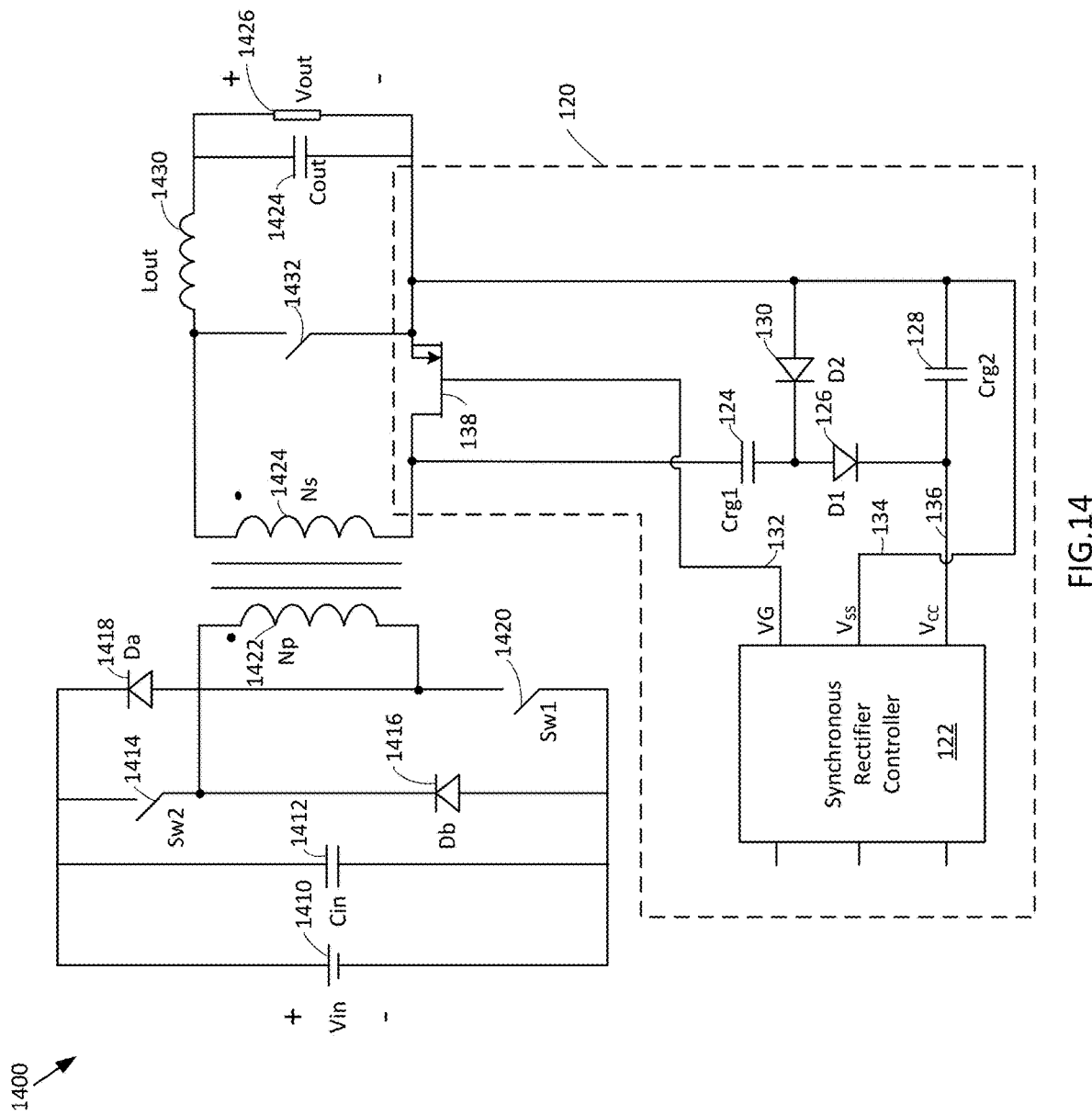
FIG. 14 is a simplified schematic of a double tube forward converter circuit according to embodiments of the disclosure.

FIG. 14 is a schematic of a double tube forward converter 1400. As shown in FIG. 14 an input voltage Vin 1410 with an input capacitance Cin 1412 is connected in parallel with the input. There are two switches, a first switch Sw1 1420 and a second switch Sw2 1414. The top of first switch Sw1 1420 is connected to the bottom of the primary winding Np 1422. The bottom of first Sw1 1420 is connected to the minus side of Vin 1410. The bottom of Np 1422 is also connected to the anode diode Da 1418. The cathode of diode Da 1418 is connected to the positive side of Vin 1410. The bottom of second switch Sw2 1414 is connected to the top of primary winding Np 1422 and is also connected to the cathode of diode Db 1416. The anode of diode Db 1416 is connected to the minus side of Vin 1410. The top of second switch Sw2 1414 is connected to the positive side of Vin 1410. The primary winding has the same polarity as the secondary. The secondary Ns 1424 is connected on the low side to the drain of FET 138 of the synchronous rectifier circuit 120. The source of FET 138 is connected to the negative rail of Vout 1426 and the capacitor Cout 1424. The high side of the secondary winding Ns 1422 is connected on one side of inductor Lout 1430 and to the top of switch 1432. The other end of inductor Lout is connected to the positive rail of Vout 1426 in parallel Cout 1424. The bottom of switch 1432 is connected to the source of FET 138.

The circuit of FIG. 14 1400 functions as follows. The first and second switches Sw1 1420 and Sw2 1414, respectively, are both closed, and the voltage Vin 1410 is connected across the primary winding Np 1422. The output of the secondary Ns 1424 winding drives the inductor Lout 1430. Since the secondary Ns 1424 is the same polarity as the primary winding Np 1422 the low power-loss supply circuit 120 is in the second time period T2. The output of the secondary is driving the inductor Lout 1430. When the input is negative the secondary is negative and the low power-loss supply circuit 120 is in the first time period T1. Since the FET 138 is open the third switch 1432 is closed as a freewheeling device of Lout 1430. The optimal value for first capacitor Crg1 may be calculated using the equation (6).

Figure 15:
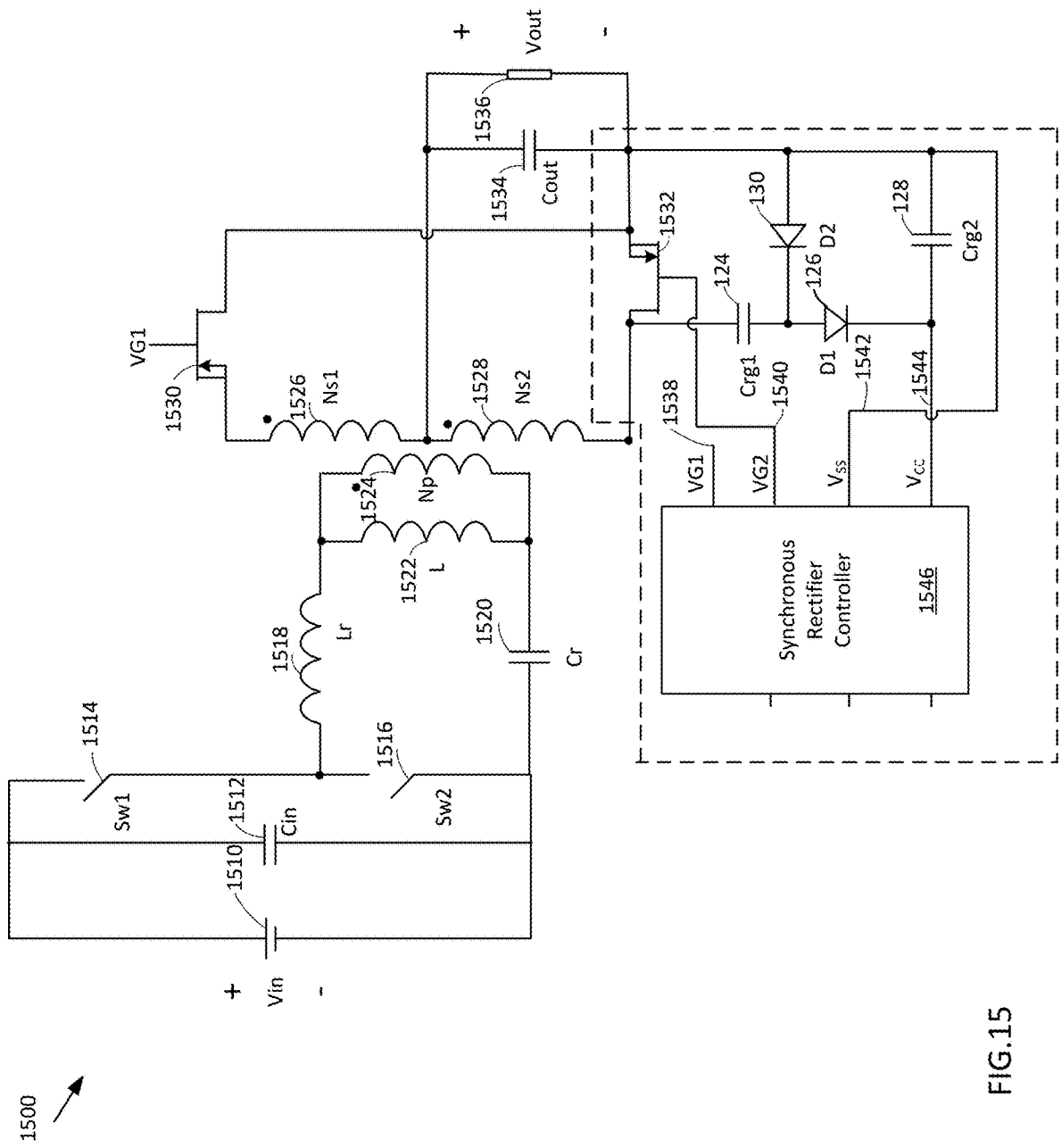
FIG. 15 is a simplified schematic of a circuit of an asymmetric half-bridge LLC converter circuit according to embodiments of the disclosure.

FIG. 15 is a schematic of a circuit of an asymmetric half-bridge LLC converter 1500. As shown in FIG. 15, circuit 1500 consists of an input voltage Vin 1510 in parallel with an input capacitance Cin 1512. Switches Sw1 1514 and Sw2 1516 are connected in series and are in parallel with the input Vin 1510. The top of switch Sw 1 1514 is connected to the positive rail of Vin 1510. The bottom of switch Sw1 1514 is connected to the top of switch Sw2 1516 and is connected to one side of inductor Lr 1518. The other end of inductor Lr 1518 is connected to the top of the primary winding Np 1524 and the inductor L 1522 which represent the primary winding inductance. The bottom of primary winding Np 1524 is connected to the bottom of the inductor L 1522 and is also connected to one end of capacitor Cr 1520. The other end of capacitor Cr 1520 is connected to the bottom of switch Sw2 1516 and is also connected to the negative rail of Vin 1510 and capacitor Cin 1512. The secondary has two windings both having the same polarity of the primary. The top of first winding Ns1 1526 is connected to the source of FET 1530. The drain of FET 1530 is connected to the negative rail of Vout 1536, is parallel capacitor Cout 1534 and it is connected to the source of FET 1532. The source of FET 1532 is connected to the anode of second diode D2 130 at one end of second capacitor Crg2 128 and is connected to Vss 1542 of the synchronous rectifier controller 1546. The bottom of secondary winding Ns1 1526 is connected to the top of secondary winding Ns2 1528 and is connected to the positive rail of Vout 1536 in parallel with Cout 1534. The bottom of secondary winding Ns2 1528 is connected to the drain of FET 1532 and is connected to one end of first capacitor Crg1 124. The other end of first capacitor Crg1 124 is connected to the anode of first diode D1 126 and the cathode of second diode D2 130. The cathode of first diode D1 126 is connected to the other end of second capacitor Crg2 128 and the Vcc 1544 input of the Synchronous Rectifier Controller 1546. VG1 1538 of the synchronous rectifier controller 1546 is connected to the gate of FET 1530. VG2 1540 of the synchronous rectifier controller 1546 is connected to the gate of FET 1532.

The circuit of FIG. 15 is a forward converter. When the input is positive and the switch Sw1 1514 is closed and Sw2 1516 is open while FET 1532 is shorted and the winding Ns2 1528 is switched across the output Vout 1536. The second diode D2 130 is forward biased and the first capacitor Crg1 124 discharges. Equivalent to time period T1 of circuit 120. FET 1530 is open. When switch Sw1 1514 is opened switch Sw2 1516 is closed and the resonant combination of Lr 1518 and Cr 1520 and L 1522 allow the current to oscillate. If the resonant current reverses the polarity of Np 1524 then the FET 1530 will be closed and FET 1532 is open and the output of the secondary winding Ns1 1226 is cross connected to Vout 1236 with an opposite polarity. The FET 1532 is open and the first capacitor Crg1 124 and the second capacitor Crg2 128 are charged by the voltage Vds across FET 1532 and first diode D1 126 is forward biased. This is equivalent to time period T2 of the low power-loss circuit 120. Second diode D2 130 is reverse biased. The circuit 1500 can full wave rectify the input and the power for the Synchronous rectifier controller is powered by Vcc 1544 when the FET 1532 is open or on the half cycle. Calculation of the optimal value for first capacitor Crg1 is given by equation given by equation 8:

$$C_{rg1} = \frac{C_{iss} \cdot V_{rg\_cc} + \bar{Q}_{ic}}{2V_o - V_{rg\_cc} - V_F} \quad \text{Equation (8)}$$

In some embodiments switches and/or diodes may be fabricated with gallium nitride GaN, silicon carbide SiC, and/or silicon. In various embodiments one or more of the switches may be field-effect devices including but not limited to enhancement mode and depletion mode devices.

One of ordinary skill in the art will appreciate that various features and aspects of the lossless synchronous rectification low power-loss supply circuit and design method can be changed, modified and manipulated which are within the scope of this disclosure.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
   a transformer winding extending between a first lead and a second lead, wherein the second lead is connected to a first output terminal;
   a solid-state switch electrically connected between the first lead and a second output terminal;
   a first capacitor coupled in series with a second capacitor forming a capacitor circuit that is coupled in parallel with the solid-state switch, wherein the first capacitor is coupled directly to the second output terminal; and
   a controller circuit arranged to control operation of the solid-state switch to be in an off state during a first time period and in an on state during a second time period such that:
      during the first time period the second capacitor is charged through the first capacitor, wherein the first capacitor limits the charge of the second capacitor; and
      during the second time period the first capacitor discharges to the second output terminal and the second capacitor supplies power to the controller circuit.

2. The circuit of claim 1, further comprising a diode coupled in series between the first capacitor and the second capacitor and arranged to allow the second capacitor to charge during the first time period and to allow the second capacitor to power the controller circuit during the second time period.

3. The circuit of claim 2, wherein the diode is a first diode, the circuit further comprising a second diode coupled in parallel with the second capacitor and arranged to allow the first capacitor to discharge to the second output terminal during the second time period.

4. The circuit of claim 2, wherein the first capacitor has a capacitance value determined by:

$$C_{rg1} = \frac{C_{iss} \cdot V_{rg\_cc} + Q_{ic}}{V_{ds} - V_{rg\_cc} - V_F}$$

wherein $C_{rg1}$ is a capacitance of the first capacitor; $C_{iss}$ is a total input capacitance of the controller circuit; $V_{rg\_cc}$ is a desired voltage, $Q_{ic}$ is a total charge to power the controller circuit, $V_{ds}$ is a drain to source voltage of the solid-state switch, and $V_F$ is a forward voltage of the diode.

5. The circuit of claim 1, wherein the transformer winding has an output polarity that is inverted relative to an input polarity.

6. The circuit of claim 1, wherein the circuit operates as a flyback converter.

7. The circuit of claim 1, wherein the solid-state switch is a gallium nitride-based field-effect transistor.

8. A method of operating a circuit, the method comprising:
operating the circuit sequentially in a first time period then in a second time period, the circuit comprising:
a transformer winding extending between a first lead and a second lead, wherein the second lead is connected to a first output terminal;
a solid-state switch electrically connected between the first lead and a second output terminal;
a first capacitor coupled in series with a second capacitor forming a capacitor circuit that is coupled in parallel with the solid-state switch, wherein the first capacitor is coupled directly to the second output terminal; and
a controller arranged to control operation of the solid-state switch such that the solid-state switch is:
in an off state during the first time period causing the second capacitor to charge through the first capacitor; and
in an on state during the second time period.

9. The method of claim 8 wherein in the first time period the first capacitor limits the charge of the second capacitor.

10. The method of claim 8, wherein the circuit further comprises a diode coupled in series between the first capacitor and the second capacitor and arranged to allow the second capacitor to charge during the first time period and to allow the second capacitor to power the controller during the second time period.

11. The method of claim 10, wherein the diode is a first diode, the circuit further comprising a second diode coupled in series with the second capacitor and arranged to allow the first capacitor to discharge to the second output terminal during the second time period.

12. The method of claim 10, wherein the first capacitor has a capacitance value determined by:

$$C_{rg1} = \frac{C_{iss} \cdot V_{rg\_cc} + Q_{ic}}{V_{ds} - V_{rg\_cc} - V_F}$$

wherein $C_{rg1}$ is a capacitance of the first capacitor; $C_{iss}$ is a total input capacitance of the controller; $V_{rg\_cc}$ is a desired voltage, $Q_{ic}$ is a total charge to power the controller, Vas is a drain to source voltage of the solid-state switch, and $V_F$ is a forward voltage of the diode.

13. The method of claim 8, wherein the transformer winding has an output polarity that is inverted relative to an input polarity.

14. The method of claim 8, wherein the circuit operates as a flyback converter.

15. The method of claim 8, wherein the solid-state switch is a gallium nitride-based field-effect transistor.

16. A circuit comprising:
a primary winding of a transformer arranged to be coupled to a power source;
a secondary winding of the transformer extending between a first lead and a second lead, the second lead connected to a first load terminal;
a solid-state switch having a source connected to the first lead and a drain connected to a second load terminal;
a first capacitor coupled in series with a second capacitor forming a capacitor circuit that is coupled in parallel with the solid-state switch, wherein the first capacitor is coupled directly to the second load terminal; and
a controller circuit that turns the solid-state switch off during a first time period and turns the solid-state switch on during a second time period, wherein during the first time period the first capacitor supplies power to the second capacitor and to the controller circuit, and wherein during the second time period the first capacitor discharges to the second load terminal and the second capacitor supplies power to the controller circuit.

17. The circuit of claim 16 wherein during the first time period the first capacitor limits a charge of the second capacitor.

18. The circuit of claim 16, wherein the circuit further comprises a diode coupled in series between the first capacitor and the second capacitor and arranged to allow the second capacitor to charge during the first time period and to allow the second capacitor to power the controller circuit during the second time period.

19. The circuit of claim 18, wherein the diode is a first diode, the circuit further comprising a second diode coupled in parallel with the second capacitor and arranged to allow the first capacitor to discharge to the second load terminal during the second time period.

20. The circuit of claim 16, wherein the solid-state switch is a gallium nitride-based field-effect transistor.

* * * * *